United States Patent [19]
Suzuki

[11] Patent Number: 5,832,128
[45] Date of Patent: Nov. 3, 1998

[54] PICTURE SIGNAL ENCODING AND DECODING APPARATUS

[75] Inventor: Kazuhiro Suzuki, Kanagawa, Japan

[73] Assignee: Fuji Xerox Co., Ltd., Tokyo, Japan

[21] Appl. No.: 887,941

[22] Filed: Jul. 3, 1997

Related U.S. Application Data

[63] Continuation of Ser. No. 417,694, Apr. 6, 1995, abandoned.

[30] Foreign Application Priority Data

Oct. 13, 1994 [JP] Japan .................................... 6-248123

[51] Int. Cl.⁶ .................................................. H04N 1/415
[52] U.S. Cl. ......................... 382/246; 382/248; 382/251; 358/432
[58] Field of Search .................................... 358/433, 432, 358/426, 261.3, 427, 261.1, 261.4; 382/248, 251, 246, 234, 233; 348/398, 397, 403, 405, 419

[56] References Cited

U.S. PATENT DOCUMENTS

| | | | |
|---|---|---|---|
| 5,101,438 | 3/1992 | Kanda et al. | 358/432 |
| 5,144,688 | 9/1992 | Bovir et al. | 382/166 |
| 5,162,923 | 11/1992 | Yoshida et al. | 358/432 |
| 5,187,755 | 2/1993 | Aragaki | 382/239 |
| 5,227,875 | 7/1993 | Suu et al. | 358/432 |
| 5,229,864 | 7/1993 | Moronaga et al. | 358/433 |
| 5,235,420 | 8/1993 | Gharavi | 348/398 |
| 5,249,066 | 9/1993 | Fukuda | 358/427 |
| 5,253,075 | 10/1993 | Sugiyama | 358/433 |

(List continued on next page.)

FOREIGN PATENT DOCUMENTS

| | | |
|---|---|---|
| 0 434 429 A2 | 6/1991 | European Pat. Off. . |
| 5-56282 | 3/1993 | Japan . |
| 5-63989 | 3/1993 | Japan . |
| 5-236450 | 9/1993 | Japan . |

OTHER PUBLICATIONS

G.K. Wallace; "The JPEG Still Picture Compression Standard", IEEE Transactions on Consumer Electronics, pp. 1–17, Dec. 1991.

Patent Abstracts of Japan Publication No. JP 5056282, dated May 3, 1993.

Patent Abstracts of Japan Publication No. JP 5063989, dated Dec. 3, 1993.

"High Resolution Color Image Coding Scheme for Office Systems", Koshi et al., Visual Communications and Image Processing '91: Visual Communication, SPIE, vol. 1605, pp. 362–373, Nov. 1991.

"A Study for High Resolution Color Image Coding Approch for Office System", Suzuki et al., Visual Communications and Image Processing '92, SPIE, vol. 1818, pp. 1554–1565, Nov. 1992.

"Image Encoding Algorithm II—Transformation Encoding—," The Journal of the Institute of the Institute of Television Engineers in Japan, vol. 43, No. 10, 1989, pp. 1145–1152 (in Japanese).

*Primary Examiner*—Edward L. Coles
*Assistant Examiner*—Cheukfan Lee
*Attorney, Agent, or Firm*—Finnegan, Henderson, Farabow, Garrett & Dunner, L.L.P.

[57] ABSTRACT

Picture signal encoding and decoding apparatus capable of realizing a satisfactory operation in encoding and decoding a picture image at a stable speed without being restricted to the upper limits of input and output speeds in a transfer path or a storage device for encoded data. In a picture signal encoding apparatus comprising a block divider, an orthogonal transformer, a quantizer and a variable length encoder, there are further included a band divider for dividing quantized coefficients into a plurality of mutually prime subsets, a plurality of variable length encoders for encoding the quantized coefficients of each subset to obtain encoded data of each subset, and a plurality of memories or transferrers for storing or transferring the encoded data of each subset individually.

8 Claims, 11 Drawing Sheets

U.S. PATENT DOCUMENTS

| | | | |
|---|---|---|---|
| 5,276,525 | 1/1994 | Gharavi | 348/398 |
| 5,301,040 | 4/1994 | Hoshi | 358/465 |
| 5,331,427 | 7/1994 | Namizuka | 358/433 |
| 5,345,317 | 9/1994 | Katsuno et al. | 358/433 |
| 5,379,122 | 1/1995 | Eschbach | 358/433 |
| 5,412,429 | 5/1995 | Glover | 348/398 |
| 5,412,484 | 5/1995 | Yoshikawa | 358/433 |
| 5,416,606 | 5/1995 | Katayama | 358/433 |
| 5,426,637 | 6/1995 | Mitra et al. | 348/398 |
| 5,442,399 | 8/1995 | Asamura et al. | 348/398 |
| 5,627,917 | 5/1997 | Chen | 382/246 |
| 5,631,744 | 5/1997 | Takeuchi et al. | 358/432 |
| 5,757,973 | 5/1998 | Wilkinson et al. | 358/432 |

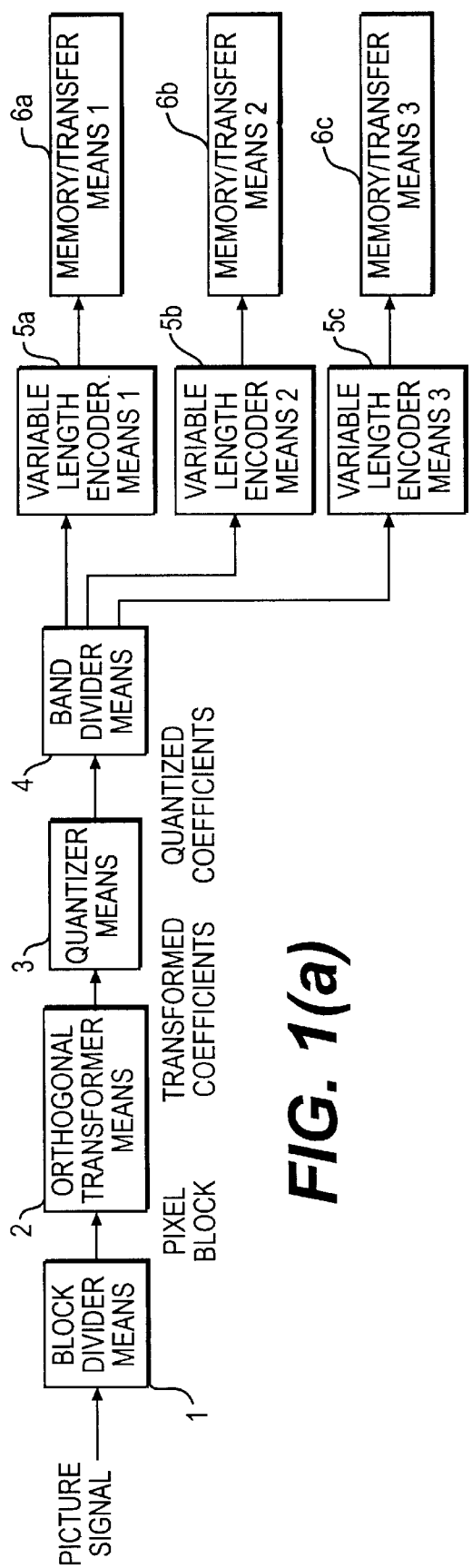
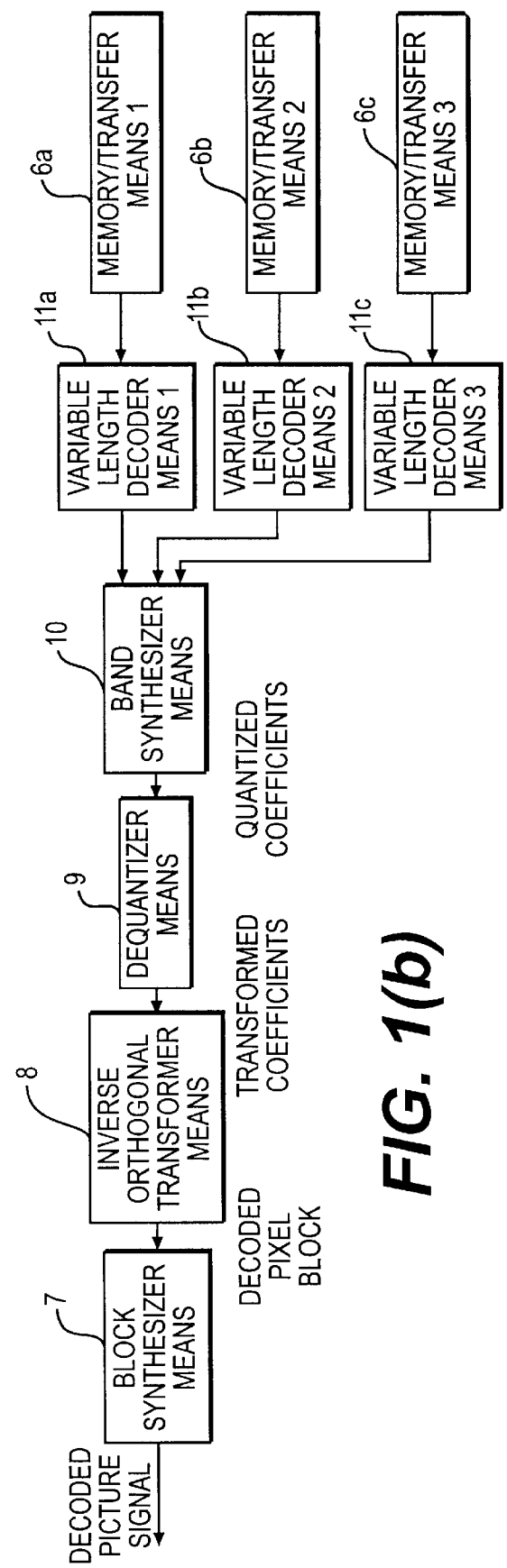
FIG. 1(a)
FIG. 1(b)

```
            ┌BAND 1
            │                           ┌BAND 2
   ┌────┬───┴┬────┬────┬────┬────┬────┬─┴──┐
   │ 0  │ 1  │ 5  │ 6  │ 14 │ 15 │ 27 │ 28 │
   ├────┼────┼────┼────┼────┼────┼────┼────┤
   │ 2  │ 4  │ 7  │ 13 │ 16 │ 26 │ 29 │ 42 │
   ├────┼────┼────┼────┼────┼────┼────┼────┤
   │ 3  │ 8  │ 12 │ 17 │ 25 │ 30 │ 41 │ 43 │
   ├────┼────┼────┼────┼────┼────┼────┼────┤       ┌BAND 3
   │ 9  │ 11 │ 18 │ 24 │ 31 │ 40 │ 44 │ 53 │
   ├────┼────┼────┼────┼────┼────┼────┼────┤
   │ 10 │ 19 │ 23 │ 32 │ 39 │ 45 │ 52 │ 54 │
   ├────┼────┼────┼────┼────┼────┼────┼────┤
   │ 20 │ 22 │ 33 │ 38 │ 46 │ 51 │ 55 │ 60 │
   ├────┼────┼────┼────┼────┼────┼────┼────┤
   │ 21 │ 34 │ 37 │ 47 │ 50 │ 56 │ 59 │ 61 │
   ├────┼────┼────┼────┼────┼────┼────┼────┤
   │ 35 │ 36 │ 48 │ 49 │ 57 │ 58 │ 62 │ 63 │
   └────┴────┴────┴────┴────┴────┴────┴────┘
```

FIG. 2

| | | | | | | | |
|---|---|---|---|---|---|---|---|
| 169 | 167 | 169 | 168 | 163 | 160 | 156 | 152 |
| 168 | 169 | 168 | 168 | 163 | 161 | 162 | 157 |
| 166 | 168 | 167 | 161 | 158 | 161 | 158 | 158 |
| 167 | 164 | 164 | 161 | 160 | 158 | 158 | 157 |
| 166 | 161 | 160 | 161 | 159 | 158 | 158 | 155 |
| 161 | 161 | 159 | 159 | 164 | 158 | 158 | 155 |
| 158 | 156 | 157 | 158 | 157 | 158 | 156 | 154 |
| 154 | 152 | 154 | 150 | 150 | 150 | 150 | 148 |

PIXEL BLOCK

FIG. 6(a)
PRIOR ART

| | | | | | | | |
|---|---|---|---|---|---|---|---|
| 253 | 23 | -3 | 2 | -2 | 3 | 0 | 2 |
| 29 | 11 | -2 | -3 | -1 | 1 | 0 | -2 |
| -9 | 2 | -4 | -1 | -1 | 1 | 1 | 0 |
| 7 | 0 | -5 | 3 | 3 | 0 | -2 | 1 |
| -8 | 4 | 0 | 0 | 2 | 2 | 1 | 0 |
| 1 | 0 | 0 | 0 | 0 | -1 | 2 | 0 |
| -3 | 2 | 0 | 0 | -1 | -3 | 1 | 1 |
| -2 | 0 | 1 | 0 | -1 | 1 | 2 | -2 |

TRANSFORMED COEFFICIENTS

FIG. 6(b)
PRIOR ART

| | | | | | | | |
|---|---|---|---|---|---|---|---|
| 16 | 11 | 10 | 16 | 24 | 40 | 51 | 61 |
| 12 | 12 | 14 | 19 | 26 | 58 | 60 | 55 |
| 14 | 13 | 16 | 24 | 40 | 57 | 69 | 55 |
| 14 | 17 | 22 | 29 | 61 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

QUANTIZATION MATRIX

FIG. 6(c)
PRIOR ART

| | | | | | | | |
|---|---|---|---|---|---|---|---|
| 16 | 2 | 0 | 0 | 0 | 0 | 0 | 0 |
| 2 | 1 | 0 | 0 | 0 | 0 | 0 | 0 |
| -1 | 0 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

QUANTIZED COEFFICIENTS

FIG. 6(d)
PRIOR ART

| | | | | | | | |
|---|---|---|---|---|---|---|---|
| 256 | 22 | 0 | 0 | 0 | 0 | 0 | 0 |
| 24 | 12 | 0 | 0 | 0 | 0 | 0 | 0 |
| -14 | 0 | 0 | 0 | 0 | 0 | 0 | 0 |
| 14 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

DEQUANTIZED COEFFICIENTS

FIG. 6(e)
PRIOR ART

| | | | | | | | |
|---|---|---|---|---|---|---|---|
| 171 | 170 | 168 | 165 | 163 | 160 | 158 | 157 |
| 168 | 167 | 165 | 163 | 161 | 159 | 157 | 156 |
| 166 | 165 | 164 | 162 | 160 | 158 | 156 | 155 |
| 166 | 165 | 164 | 163 | 161 | 159 | 158 | 157 |
| 166 | 166 | 165 | 163 | 162 | 161 | 160 | 160 |
| 163 | 163 | 162 | 161 | 161 | 160 | 159 | 159 |
| 157 | 157 | 167 | 156 | 156 | 155 | 155 | 155 |
| 152 | 152 | 152 | 152 | 151 | 151 | 151 | 161 |

DECODED PIXEL BLOCK

FIG. 6(f)
PRIOR ART

| 0 | 1 | 5 | 6 | 14 | 15 | 27 | 28 |
|---|---|---|---|----|----|----|----|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

| GROUP NO. | DC COMPONENT DIFFERENCE | NUMBER OF OVERHEAD BITS |
|---|---|---|
| 0 | 0 | 0 |
| 1 | -1, 1 | 1 |
| 2 | -3, -2, 2, 3 | 2 |
| 3 | -7..., -4, 4,..7 | 3 |
| 4 | -15.. -8, 8.. 15 | 4 |
| 5 | -31..-16, 16.. 31 | 5 |
| 6 | -63.. -32, 32.. 63 | 6 |
| 7 | -127.. -64, 64.. 127 | 7 |
| 8 | -255.. -128, 128.. 255 | 8 |
| 9 | -511.. -256, 256.. 511 | 9 |
| 10 | -1023.. -512, 512.. 1023 | 10 |
| 11 | -2047.. -1024, 1024.. 2047 | 11 |
| 12 | -4095.. -2048, 2048.. 4095 | 12 |
| 13 | -8091.. -4096, 4096.. 8091 | 13 |
| 14 | -16383.. -8092, 8092.. 16383 | 14 |
| 15 | -32767.. -16384, 16384.. 32767 | 15 |

FIG. 9
PRIOR ART (SIZE)
( 0) 00
( 1) 010
( 2) 011
( 3) 100
( 4) 101
( 5) 110
( 6) 1110
( 7) 11110
( 8) 111110
( 9) 1111110
(10) 11111110
(11) 111111110

FIG. 10
PRIOR ART

| GROUP NO. | AC COEFFICIENTS | NUMBER OF OVERHEAD BITS |
|---|---|---|
| 1 | -1,1 | 1 |
| 2 | -3, -2,2, 3 | 2 |
| 3 | -7..., -4,4,..7 | 3 |
| 4 | -15.. -8,8.. 15 | 4 |
| 5 | -31..-16,16.. 31 | 5 |
| 6 | -63.. -32,32.. 63 | 6 |
| 7 | -127.. -64,64.. 127 | 7 |
| 8 | -255.. -128,128.. 255 | 8 |
| 9 | -511.. -256,256.. 511 | 9 |
| 10 | -1023.. -512,512.. 1023 | 10 |
| 11 | -2047.. -1024,1024.. 2047 | 11 |
| 12 | -4095.. -2048,2048.. 4095 | 12 |
| 13 | -8091.. -4096,4096.. 8091 | 13 |
| 14 | -16383.. -8092,8092.. 16383 | 14 |
| 15 | -32767.. -16384,16384.. 32767 | 15 |

FIG. 11
*PRIOR ART*

| RUN \ SIZE | 0 | 1 | 2 | ... | 15 |
|---|---|---|---|---|---|
| 0 | (0,0) | (0,1) | (0,2) | ..... | (0,15) |
| 1 | (1,0) | (1,1) | | ..... | |
| 2 | (2,0) | | ENCODED SYMBOL DETERMINED BY COMBINATION OF NNNN AND SSSS | | |
| ⋮ | ⋮ | | | | |
| 15 | (15,0) | | ..... | | (15,15) |

FIG. 12
*PRIOR ART*

(RUN /SIZE)
( 0, 0) 1010
( 0, 1) 00
( 0, 2) 01
( 0, 3) 100
( 0, 4) 1011
( 0, 5) 11010
( 0, 6) 1111000
( 0, 7) 11111000
( 0, 8) 1111110110
( 0, 9) 1111111110000010
( 0,10) 1111111110000011
( 0, 1) 1100
( 1, 2) 11011
( 1, 3) 1111001
( 1, 4) 111110110
( 1, 5) 11111110110
( 1, 6) 1111111110000100
( 1, 7) 1111111110000101
( 1, 8) 1111111110000110
( 1, 9) 1111111110000111
( 1,10) 1111111110001000
( 2, 1) 11100
( 2, 2) 11111001
( 2, 3) 1111110111
( 2, 4) 111111110100
( 2, 5) 1111111110001001
( 2, 6) 1111111110001010
( 2, 7) 1111111110001011
( 2, 8) 1111111110001100

( 2, 9) 1111111110001101
( 2,10) 1111111110001110
( 3, 1) 111010
( 3, 2) 111110111
( 3, 3) 111111110101
( 3, 4) 1111111110001111
( 3, 5) 1111111110010000
( 3, 6) 1111111110010001
( 3, 7) 1111111110010010
( 3, 8) 1111111110010011
( 3, 9) 1111111110010100
( 3,10) 1111111110010101
( 4, 1) 111011
( 4, 2) 1111111000

OMITTED (14,10) 1111111111110100
(15, 0) 11111111001
(15, 1) 1111111111110101
(15, 2) 1111111111110110
(15, 3) 1111111111110111
(15, 4) 1111111111111000
(15, 5) 1111111111111001
(15, 6) 1111111111111010
(15, 7) 1111111111111011
(15, 8) 1111111111111100
(15, 9) 1111111111111101
(15,10) 1111111111111100

*FIG. 13*
*PRIOR ART*

DC (COEFFICIENT DIFFERENCE FROM PRECEDING BLOCK: 2)

| GROUP NO. | HUFFMAN CODE | OVERHEAD BIT |
|---|---|---|
| (2) | 011 | 01 |

AC

| (RUN LENGTH, GROUP NO.) | HUFFMAN CODE | OVERHEAD BIT |
|---|---|---|
| ( 0, 2) | 01 | 10 |
| ( 0, 2) | 01 | 10 |
| ( 0, 1) | 10 | 0 |
| ( 0, 1) | 10 | 1 |
| ( 4, 1) | 111011 | 1 |
| (15, 0) | 11111111001 | NONE |
| (15, 0) | 11111111001 | NONE |
| (15, 0) | 11111111001 | NONE |
| ( 0, 0) | 1010 | NONE |

FIG. 14
PRIOR ART 011 10 01 10 01 10 10 0 10 1 111011 1 11111111001 11111111001 11111111001 1010

(TOTAL 63 BITS)

FIG. 15
PRIOR ART

PICTURE SIGNAL ENCODING AND DECODING APPARATUS

This is a continuation of application Ser. No. 08/417,694, filed Apr. 6, 1995, now abandoned.

BACKGROUND OF THE INVENTION

1. Field of the Invention

The present invention relates to an apparatus for encoding and decoding a picture signal.

2. Description of the Related Art

A variety of techniques for efficiently encoding a tonal or color picture image have been contrived heretofore. The encoding systems are classified into a reversible-encoding system which is capable of reproducing the same picture image as an original one, and a non-reversible encoding system where a decoded picture image is not coincident with an original one due to some concomitant data loss. In general, a higher compression rate is attainable by the non-reversible encoding. An orthogonal transformation encoding process is a typical one relative to the non-reversible encoding system.

Hereinafter the outline of the orthogonal transformation encoding will be briefly described.

In the orthogonal transformation encoding, a picture image is divided into pixel blocks each being a rectangular region of picture elements, and orthogonal transformation is performed per pixel block so that the picture image is transformed into signals of frequency regions to be thereby encoded. In picture image termed a natural image representing a person, a scene or the like, the autocorrelation of pixel values is high, so that almost the entire signal power after the orthogonal transformation is concentrated in lower-frequency coefficients. Utilizing such attribute, the lower-frequency coefficients after the orthogonal transformation are quantized with a higher density for allocation of many bits thereto, while higher-frequency coefficients are quantized with a lower density to curtail the number of bits, hence attaining a superior compression efficiency as a whole.

The orthogonal transformation encoding is adapted to realize high tone reproducibility to consequently attain a high compression rate in a photographic region. However, when it is applied to any character image or the like including many edges, there is known a disadvantage that, since the power is distributed up to higher-frequency coefficients, the picture quality is deteriorated due to reduction of the encoding efficiency and truncation of the higher-frequency coefficients.

Also in the orthogonal transformation encoding system, there is known such attribute that the code quantity of each pixel block is continuously changed as a result of variation in the distribution of the signal power after the transformation depending on the contents of the pixel blocks, and also due to mismatching of the code table at the time of variable-length encoding.

Now an exemplary conventional constitution of the prior art will be described below with reference to a block diagram of FIG. 5. In this diagram, there are shown a block divider 100 for dividing a picture signal into pixel blocks each composed of m×n picture elements (where m and n are positive integers); a DCT (discrete cosine transform) processor 101 for executing a DCT process to the pixel blocks and outputting transformed coefficients; a quantizer 102 for quantizing the transformed coefficients with predetermined quantization characteristic and outputting the quantized coefficients; a quantization table 103 where the quantization characteristic is preset; a scanner 104 for zigzag-scanning a matrix of the quantized coefficients and rearranging the coefficients; a variable length encoder 105 for allocating variable-length codes to combinations of the quantized coefficients rearranged in the order of the zigzag scanning; a code table 106 where the variable length codes are registered; a buffer 107 for storing the variable-length codes in the output order; and a transferrer or a memory 108.

The operation of the above conventional example will now be described below with reference to FIG. 5.

First in the block divider 100, a picture signal is divided into pixel blocks each composed of m×n picture elements (where m and n are positive integers).

In the DCT processor 101, each of the divided pixel blocks is encoded by the discrete cosine transform (DCT) which is one of the transform encoding systems. Regarding the orthogonal transformation encoding based on such DCT, there is known the system disclosed in Wallace: "The JPEG Still Picture Compression Standard," Communications of the ACM (April, 1991).

Hereinafter the operation of the DCT processor 101 will be described in detail.

In the DCT processor 101, each input pixel block of a rectangular region composed of 8×8 picture elements is encoded by the DCT process. Two-dimensional DCT of degree eight is given by Eq. (1), and inverse one is given by Eq. (2) as shown below.

$$F(u,v) = \frac{C(u)C(v)}{4} \sum_{i=0}^{7} \sum_{j=0}^{7} f(i,j) \cdot \cos\frac{(2i+1)u\pi}{16} \cos\frac{(2j+1)v\pi}{16} \quad (1)$$

$$f(i,j) = \frac{1}{4} \sum_{u=0}^{7} \sum_{v=0}^{7} C(u)C(v)F(u,v) \cdot \cos\frac{(2i+1)u\pi}{16} \cos\frac{(2j+1)v\pi}{16} \quad (2)$$

$$C(w) = \begin{cases} \frac{1}{\sqrt{2}} & w = 0 \\ 1 & w = 1,2,\ldots,7 \end{cases} \quad (3)$$

In the above equations: f(i,j) stands for each element of the pixel block; i,j for the position of each element; F(u,v) for each element of the transformed coefficients; u, v for the position of each element; and C(w) for C(u) or C(v), respectively.

FIG. 6(b) shows transformed coefficients obtained by executing, with respect to the pixel block of FIG. 6(a), the two-dimensional DCT of degree eight given by Eq. (1). As shown in FIG. 7, the element positioned at the leftmost top of the matrix of the transformed coefficients is termed a DC coefficient since it corresponds to the mean luminance of the pixel block. Meanwhile any other element than the DC coefficient is termed an AC coefficient.

In the AC coefficients, those in the rightmost column correspond to highest-frequency components in the horizontal direction, and those in the lowermost row corresponds to the highest-frequency components in the vertical direction. In the matrix, the rightmost bottom element corresponds to the highest-frequency component in both horizontal and vertical directions.

The transformed coefficients outputted from the DCT processor 101 are quantized in the quantizer 102 and then are outputted therefrom as quantized coefficients. The quantization is a process to obtain a quotient by dividing each element of the transformed coefficients by a corresponding element of the quantized coefficient matrix. This process is defined as follows.

$$F^Q(u,v)=(F(u,v)+(Q(u,v)/2))/Q(u,v) \text{ where } F(u,v) \geq 0 \quad (4)$$

$$F^Q(u,v)=(F(u,v)-(Q(u,v)/2))/Q(u,v) \text{ where } F(u,v) < 0 \quad (5)$$

In the above equations, F(u,v), Q(u,v) and FQ(u,v) represent each element of the transformed coefficients, the quantization matrix and the quantized coefficients, respectively. And u,v represents the position of each element.

FIG. 6(c) shows an example of the quantization matrix determined in consideration of the visual characteristics of the individual frequency components. In the case of a natural picture image, the signal power is concentrated on lower-frequency coefficients so that, as shown in FIG. 6(c), it is generally customary that small values are set for quantizing the coefficients corresponding to the lower-frequency components so as to perform fine quantization while great values are set for quantizing the coefficients Corresponding to the higher-frequency components so as to perform coarse quantization.

FIG. 6(d) shows quantized coefficients obtained by linear quantization of the transformed coefficients of FIG. 6(b) with the quantization matrix of FIG. 6(c).

The quantized coefficients are zigzag scanned by the scanner 104 in the order of numerals 0–63 of the matrix shown in FIG. 8, whereby the coefficients are rearranged to be one-dimensional.

In the variable length encoder 105, the one-dimensional quantized coefficients are Huffman-coded. The DC component and the AC component are encoded individually. The Huffman codes used for such encoding are registered in the code table 106.

Now an explanation will be given on how the DC coefficients are encoded. In this case, the difference between the relevant DC coefficient and another DC coefficient of the preceding block is obtained, and a group number is determined according to FIG. 9. The group number thus determined is Huffman-coded. And additional overhead bits equal in number to the group number are annexed for indicating the correspondence of the difference to one of the numerical values in the group.

For example, if the DC component of the preceding block is 14 in the quantized coefficients of FIG. 6(d), the difference between the relevant DC component and the component of the preceding block is calculated as 16−14=+2. It is found from FIG. 9 that the group number in this case is 2, and a binary code 011' corresponding to the group number 2 is selected for encoding from the code table of DC components shown in FIG. 10. Further, 2-bit data is annexed for identifying four values of −3, −2, 2 and 3 which belong to the group number 2. For example, 10' is additionally annexed in the case of 2.

Next, an explanation will be given on how the AC coefficients are encoded.

The AC coefficients are encoded in the order of numerals 1–63 in the matrix of FIG. 8. And there is counted the length (zero run) where zero coefficients (ineffective coefficients) are successive until appearance of a non-zero coefficient (effective coefficient) in this order. Upon appearance of an effective coefficient, as shown in FIG. 11, the group number is determined in accordance with the value of the coefficients. And there is also determined an additional overhead bit which indicates the value taken in the group by the AC coefficient.

In the AC coefficient code table, a Huffman code is allocated to each combination of the above-described zero run length and the group number of the succeeding effective coefficient. FIG. 12 shows 256 combinations of (0,0) to (15,15) of zero run lengths and group numbers of effective coefficients. And a binary code of FIG. 13 is given to each of such combinations.

As mentioned, each AC coefficient is encoded by a combination of a zero run length and a group number of a succeeding effective coefficient, and also by an additional overhead bit indicating the correspondence of the effective coefficient to the relevant numerical value in the group. The above operation is performed continuously until the entire effective coefficients in the block are processed. If it is found during the operation that all of the remaining AC coefficients in the block are zeros, an EOB (end of block) may be coded at that instant to thereby complete the process for one block.

FIG. 14 shows an example of encoding the quantized coefficients of FIG. 6(d) in accordance with the procedure described above. And FIG. 15 shows a bit stream obtained as a coded output. In this example, total 512-bit data of one block of 8×8 picture elements, each of which is composed of 8 bits, are compressed to 63 bits.

In a decoding mode, the data is Huffman-decoded by a procedure reverse to the foregoing one to thereby reproduce the quantized coefficients of FIG. 6(d). Subsequently, the quantized coefficients are multiplied respectively by the corresponding elements of the quantization matrix shown in FIG. 6(c), whereby dequantized coefficients of FIG. 6(e) are obtained. Thereafter an inverse DCT process according to Eq. (2) is executed with respect to the dequantized coefficients, so that a decoded pixel block of FIG. 6(f) can be obtained.

The picture image data can thus be encoded and decoded by the above process in the transform encoding system. The size of the data encoded by such system varies depending on the content of each pixel block.

The encoded data outputted from the variable length encoder 105 is stored in the variable length code buffer 107.

In this manner, a picture signal can be encoded and decoded by the transform coding system with the constitution and the operation described above.

However, when a picture signal is encoded by the transform coding system, the code quantity varies in dependence on the content of each pixel block, so that in case the pixel block includes high-frequency components such as edges of characters or dots of a printed manuscript, there exists a disadvantage that the encoding efficiency is lowered. For this reason, the following problems arise in applying the transform coding system to a practical image processing apparatus.

Normally, the coded data input/output speed is restricted by the upper limit of the data transfer rate in a transfer path and also by that of the input/output speed in a storage device.

Therefore, when the encoding efficiency is lowered in the encoding mode, the output code data is increased in comparison with the pixel block being inputted at a fixed speed, so that if the quantity of the generated code data exceeds the aforementioned upper limit, it is necessary to halt the input of the pixel block or to reduce the pixel-block input speed.

Meanwhile in a decoding mode, reduction of the compression rate causes an increase of the code data quantity required for generating a fixed decode pixel block, so that it becomes necessary to supply more code data from a decoder. In case the quantity of the code data being transferred exceeds the aforementioned upper limit, proper fixed-speed decoding of pixel blocks fails to be performed to consequently induce a halt of output of the decoded pixel blocks or a delay of such output.

It is known that, more specifically, the above problems are raised under the following circumstances.

[1-1] When any document including a character region or a dot region is inputted from a scanner and then the sequentially encoded data are stored in a memory device, the input speed to the memory device may induce a problem since the quantity of the generated codes is increased due to the presence of edges in the character region.

[1-2] When the encoded data stored in the memory device are decoded and then are printed sequentially by means of a printer, a fixed decoding speed is requisite. In a xerographic printer for example, an electrostatic latent image is formed on a sensitive medium, which is rotated at a fixed velocity, by the irradiation of a laser beam obtained through modulation of the picture signal, so that it is necessary to input the picture signal in synchronism with a predetermined clock signal, and the picture clock cannot be altered or stopped in compliance with the variation of the picture image decoding speed.

[2-1] When frame signals of digital moving pictures inputted from a camera or the like, or difference signals of such frame signals, are sequentially encoded and then are stored in a memory device, the quantity of the generated codes is increased as a result of any great motion of a subject being shot or due to occurrence of a scene change, so that the input speed to the memory device may induce a problem.

[2-2] When encoded data of digital moving pictures stored previously in a memory device are read out therefrom and then the picture signals are decoded, some frame dropout may be caused in case a predetermined decode pixel rate fails to be satisfied, to thereby bring about deterioration of the image quality.

In Japanese Patent Laid-open No. Hei 5 (1993)-236450, there is disclosed a video data compression encoding apparatus contrived for the purpose of realizing high data compression effect even if input data values are widely dispersed, wherein, when video data are encoded by the technique of discrete cosine transform or the like, the transformed data are divided into "DC plus AC lower-frequency components" and "AC higher-frequency components," and such divided components are encoded by means of exclusive encoders respectively.

However, in the above encoding apparatus, an optimal code table needs to be prepared for each of the divided frequency bands so as to enhance the encoding efficiency, and there exists another disadvantage that the memories for storing the individual code tables are increased in number. Furthermore, in view of attaining a faster operation, a surplus process is unavoidable due to the procedure of first encoding the same band by a plurality of difference encoders, then determining the output code to be selected in accordance with the code quantity, and outputting the encoded data with identification data affixed thereto.

SUMMARY OF THE INVENTION

It is an object of the present invention to provide an improved picture signal encoding and decoding apparatus which is capable of performing satisfactory encoding and decoding of picture signals without the necessity of increasing the number of code memories and at a stable speed while being not restricted by the upper limit speed in an encoded data input/output transfer path or in a storage device either.

According to a first aspect of the present invention, there is provided a picture signal encoding apparatus which comprises a block divider means for dividing a picture signal into pixel blocks each having a rectangular region of M×N picture elements (where M and N are positive integers); an orthogonal transformer means for executing orthogonal transformation of the pixel blocks to thereby obtain transformed coefficients; a quantizer means for quantizing the transformed coefficients with predetermined quantization characteristic to thereby obtain quantized coefficients; and a variable length encoder means for variable-length encoding the quantized coefficients to obtain encoded data. The apparatus further comprises a band divider means for dividing the quantized coefficients into a plurality of mutually prime subsets; a plurality of variable-length encoder means for variable-length encoding each of the subsets of the quantized coefficients to obtain encoded data of each subset; and a plurality of memory or transfer means for storing or transferring the encoded data of each subset individually.

According to a second aspect of the present invention, there is provided a picture signal encoding apparatus which is similar to the foregoing and further comprises a plurality of band divider means for dividing the transformed coefficients into a plurality of mutually prime subsets; a plurality of quantizer means for quantizing the transformed coefficients of each of the subsets to obtain quantized coefficients of each subset; a plurality of variable-length encoder means for variable-length encoding the quantized coefficients of each of the subsets to obtain encoded data of each subset; and a plurality of memory or transfer means for storing or transferring the encoded data of each subset individually.

According to a third aspect of the present invention, there is provided a picture signal encoding apparatus which is similar to any of the foregoing ones, wherein, when the transformed coefficients or the quantized coefficients are divided into a plurality of mutually prime subsets, boundaries of such division are determined by the positions of one-dimensional series obtained by zigzag-scanning the matrix of the transformed coefficients or the quantized coefficients from a lower-frequency region to a higher-frequency region thereof.

According to the fourth aspect of the present invention, there is provided a picture signal decoding apparatus which comprises a memory or transfer means for storing or transferring encoded data; a variable length decoder means for variable-length decoding the encoded data to thereby obtain quantized coefficients; a dequantizer means for dequantizing the quantized coefficients to obtain transformed coefficients; an inverse orthogonal transformer means for executing inverse orthogonal transformation of the transformed coefficients to obtain decoded pixel blocks; and a block synthesizer means for synthesizing the decoded pixel blocks to thereby produce decoded picture signals. The decoding apparatus further comprises memory or transfer means for storing or transferring the encoded data of each subset individually; a plurality of variable length decoder means for variable-length decoding the encoded data of each subset individually to thereby obtain quantized coefficients of each subset; and band synthesizer means for synthesizing the quantized coefficients of each subset to thereby obtain quantized coefficients of one block.

According to the fifth aspect of the present invention, there is provided a picture signal decoding apparatus which is similar to the preceding one and further comprises memory or transfer means for storing or transferring the encoded data of each subset individually; a plurality of variable length decoder means for variable-length decoding the encoded data of each subset individually to thereby obtain quantized coefficients of each subset; a plurality of dequantizer means for dequantizing the quantized coefficients of each subset to obtain transformed coefficients of each subset; and band synthesizer means for synthesizing the transformed coefficients of each subset to thereby obtain transformed coefficients of one block.

In the above apparatus, a picture signal is divided by the block divider means into pixel blocks each composed of M×N picture elements (where M and N are positive integers), and orthogonal transformation is executed for each pixel block to obtain transformed coefficients. Such coefficients are quantized by the quantizer means to obtain quantized coefficients with curtailment of the data. Subsequently the quantized coefficients are divided into a plurality of subsets and then are encoded individually by the plurality of variable length encoder means to produce encoded data per subset, whereby the process can be executed faster with an enhanced efficiency. Since the encoded data of each subset is smaller in quantity than the encoded data obtained by variable-length encoding the entire quantized coefficients, it becomes possible to reduce the time required for storage or transfer of the data by the individual memory or transfer means.

The encoded data of each subset obtained from the encoded-data memory or transfer means are decoded by the plurality of variable length decoder means, so that quantized coefficients of each subset are thereby decoded. Since the operation of reading or transferring the encoded data and the operation of variable-length decoding the data are performed in parallel, the process can be executed faster. The quantized coefficients obtained by the above procedure are dequantized to produce transformed coefficients, which are then processed through inverse orthogonal transformation to thereby obtain decoded pixel blocks. Thereafter the decoded pixel blocks are synthesized to reproduce the decoded picture signal. As the processing speed posterior to the variable length encoding remains unchanged, a stable decoding speed can be ensured due to the parallel operation mentioned.

The above and other features and advantages of the present invention will become apparent from the following description which will be given with reference to the illustrative accompanying drawings.

BRIEF DESCRIPTION OF THE DRAWINGS

FIG. 1(a) and 1(b) are block diagrams for explaining the principle of the present invention;

FIG. 2 is an explanatory diagram showing division of bands;

FIG. 6(a) through 6(f) show examples of discrete cosine transform and quantization;

FIG. 9 shows how DC coefficients are grouped;

FIG. 10 shows a Huffman code table of DC coefficients;

FIG. 11 shows how AC coefficients are grouped;

FIG. 12 shows how AC coefficients are Huffman-coded two dimensionally;

FIG. 13 shows a Huffman code table (partial excerpt) of AC coefficients;

FIG. 14 shows an example of encoding the quantized coefficients of FIG. 6(c) are encoded; and FIG. 15 shows an output bit string.

DESCRIPTION OF THE PREFERRED EMBODIMENTS

Figure 3A:
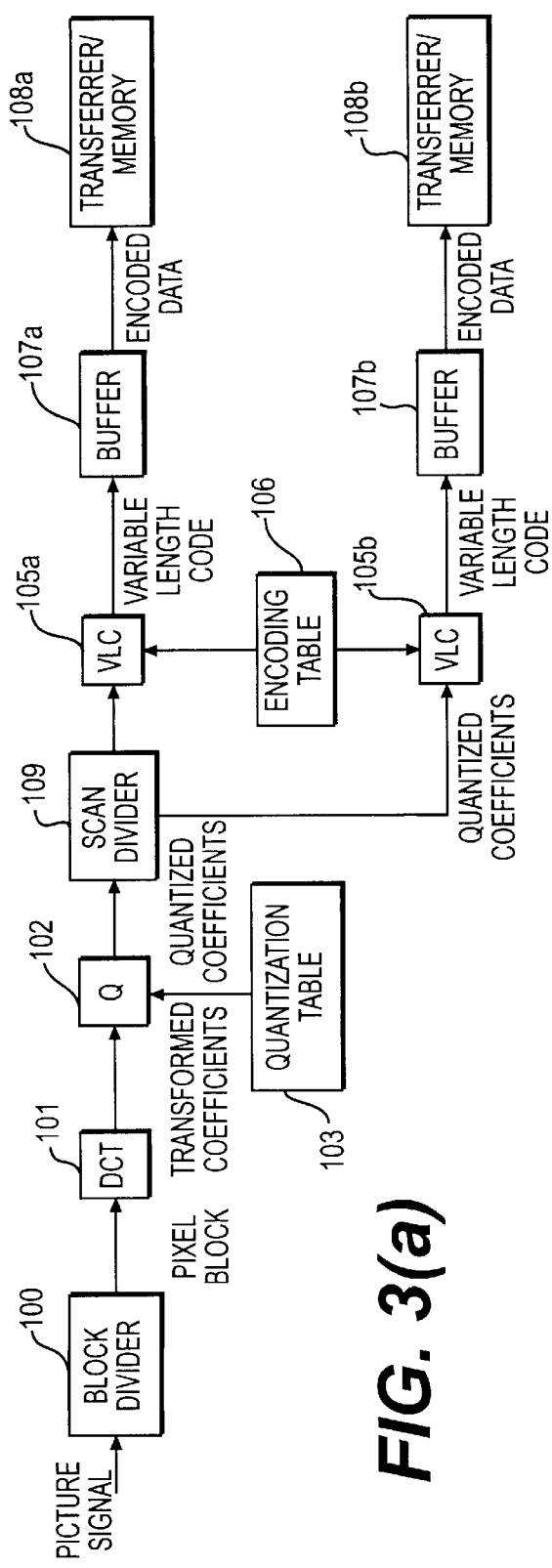
FIG. 3(a) and 3(b) are block diagrams of an embodiment according to the present invention.

FIG. 1(a) is a block diagram for explaining the principle of the encoding system according to the present invention. The constitution thereof will be described below with reference to the diagram.

In this diagram, there are included a block divider means 1 for dividing a picture signal into pixel blocks each having a rectangular region of M×N picture elements (where M and N are positive integers); an orthogonal transformer means 2 for executing orthogonal transformation of the pixel blocks to thereby obtain transformed coefficients; a quantizer means 3 for quantizing the transformed coefficients and outputting the quantized coefficients; a band divider means 4 for dividing the transformed coefficients into a plurality of bands; variable-length encoder means 5a, 5b, 5c for variable-length encoding the respective quantized coefficients of the individual divided bands and outputting the encoded data; and memory/transfer means 6a, 6b, 6c for storing or transferring the encoded data.

Hereinafter the encoding operation will be described with reference to FIG. 1(a).

As in the conventional transform encoding system known heretofore, a picture signal is divided by the block divider means 1 into pixel blocks each composed of M×N picture elements. Then the pixel blocks are processed in the orthogonal transformer means 2 to be thereby converted to transformed coefficients which are frequency space data.

The transformed coefficients are quantized by the quantizer means 3 with predetermined quantization characteristic and then are outputted as quantized coefficients.

The quantized coefficients are rearranged in a predetermined order by the band divider means 4 to form one-dimensional series. Further the quantized coefficients are divided into a plurality of subsets (bands) according to predetermined positions in the one-dimensional series. Division into such bands is executed in such a manner that the bands have no overlap with each other and are mutually prime, i.e., none of the quantized coefficients belongs to any plurality of bands.

FIG. 2 is an explanatory diagram showing 8×8 quantized coefficients obtained through orthogonal transformation and quantization of a block of 8×8 picture elements, and also showing the order to arrange the quantized coefficients in one-dimensional series, with the role relative to the mutually prime bands. In this diagram, numerals 0 to 63 denote the scanning order at the time of arranging the quantized coefficients in one-dimensional series. The thick lines in the diagram denote boundaries along which the quantized coefficients are divided when "20" and "48" are given as positions for division of the bands. Along the boundary lines in the diagram, the entire quantized coefficients can be divided in the scanning order into those numbered 0 to 20 (band 1), those numbered 21 to 48 (band 2) and those numbered 49 to 63 (band 3).

The quantized coefficients divided by the band divider means 4 are variable-length encoded individually by the variable-length encoder means 5a and 5b. When the quantized coefficients belonging to the band 1 in FIG. 2 are variable-length encoded, DC component encoding is applied to the quantized coefficient at position "0" as in the conventional known system, while AC component encoding is applied to the quantized coefficients at positions "1 to 20." As for the bands 2 and 3, AC component encoding is applied to the coefficients "21 to 48" and "49 to 63" respectively. In any of the bands, if all of the coefficients are zeros successively until the last coefficient position, an EOB (end of block) code is affixed to complete the band encoding operation.

In the procedure mentioned above, the data encoded per band are stored or transferred individually by the memory/transfer means 6a, 6b, 6c.

FIG. 1(b) is a block diagram for explaining the principle of the decoding system according to the present invention. The constitution thereof will be described below with reference to the diagram.

In this diagram, there are included variable-length decoder means 11a, 11b, 11c for decoding the encoded data of the individual bands stored in or transferred to the memory/transfer means 6a, 6b, 6c and reconstructing the quantized coefficients of the individual bands; a band synthesizer means 10 for synthesizing the quantized coefficients of the individual bands and outputting the quantized coefficients which correspond to the pixel block; a dequantizer means 9 for dequantizing the quantized coefficients to thereby obtain transformed coefficients of each band; an inverse orthogonal transformer means 8 for executing inverse orthogonal transformation of the transformed coefficients to thereby produce a decoded pixel block; and a block synthesizer means 7 for synthesizing the decoded pixel blocks to reconstruct a decoded picture.

The plurality of variable-length encoder means have a common encoding table. There may be contrived another configuration where such variable-length encoders have separate encoding tables in conformity with the individual divided bands. However, in any image composed principally of characters, the power is dispersed in the higher-frequency coefficients as well due to the influence of the character edges, and the power distribution state to the coefficients is different depending on the directions of the edges included in the pixel blocks.

Therefore, in any document composed principally of characters, it is considered difficult to arrange the higher-frequency coefficients to form data having extreme deviations in the incidence probability.

For achieving enhancement of the efficiency in the system where the variable-length encoder means have separate encoding tables in conformity with the individual divided bands, it is necessary to assume the incidence probability of lower-frequency and higher-frequency regions (or to calculate the incidence probability from some images). However, in any character image were the sizes and directions of the edges are diverse, there is no extreme deviation in the incidence probability, so that the generated code table or encoding table is presumed to be inefficient.

In the above system, the maximum enhancement of the efficiency may be attained by previously scanning a document to be encoded and then generating an optimal code table per document, but this operation may bring about a disadvantage of lowering the processing speed due to the necessity of scanning the document twice.

For the reasons mentioned, it is desired that, with respect to a character document or any other one where both characters and photographs are coexistent, the plural variable-length encoder means have a common encoding table so as to realize packaging facility and reduction of the apparatus scale, hence achieving enhancement of the encoding efficiency with certainty.

Now the decoding operation will be described below with reference to FIG. 1(b).

In this diagram, the data encoded per band by the encoding system of the present invention are stored in or transferred to the memory/transfer means 6a, 6b, 6c individually and then are decoded by the variable-length decoder means 11a, 11b, 11c, whereby the quantized coefficients of each band are reconstructed. Thereafter the quantized coefficients of one block are synthesized by the band synthesizer means 10 in the procedure reverse to the encoding one for division into the bands. The quantized coefficients are dequantized by the dequantizer means 9, so that transformed coefficients are reproduced. Subsequently, inverse orthogonal transformation of the transformed coefficients is executed by the inverse orthogonal transformer means 8, and the decoded pixel blocks are synthesized by the block synthesizer means 7 to thereby reproduce a decoded picture.

Thus, the picture signal can be decoded according to the constitution and the operation mentioned.

Although the number of the divided bands is three in the example described above, it is not limited merely to three alone in the present invention and may be two or any other number greater than three.

Furthermore, in FIG. 1(a) where the coefficients quantized by the quantizer means 3 are divided into bands by the band divider means 4, it is possible to replace the quantizer means 3 and the band divider means 4 with each other. More specifically, the effect of the present invention can be attained in another configuration where the transformed coefficients outputted from the orthogonal transformer means 2 are divided into bands, and then the transformed coefficients of the individual bands are quantized by a plurality of quantizer means 3 respectively.

Also in the decoding system of FIG. 1(b), it is similarly possible to change the relationship of connection between the dequantizer means 9 and the band synthesizer means 10. In this case, a plurality of dequantizer means 9 are provided correspondingly to the quantized coefficients of the individual bands decoded by the variable-length decoder means 11a, 11b, 11c, and the transformed coefficients of the individual bands obtained through dequantization per band are synthesized in the band synthesizer means 10 to thereby obtain desired transformed coefficients.

Embodiment 1

Hereinafter the constitution of a preferred embodiment of the present invention will be described with reference to FIG. 3. Although a pixel block of 8×8 picture elements will be explained as a unit to be processed in the following description, it is to be understood that the present invention is not limited thereto alone.

FIG. 3(a) shows the constitution of the embodiment representing the encoding system of the present invention. In this diagram, there are included a block divider 100 for dividing a picture signal into pixel blocks each having a rectangular region of 8×8 picture elements; a DCT processor 101 for executing a two-dimensional DCT process of the pixel blocks to obtain transformed coefficients; a quantizer 102 for quantizing the transformed coefficients and outputting the quantized coefficients of each band; a quantization table 103 where quantization characteristic for linearly quantizing the transformed coefficients is preset as a quantization matrix; a scan divider 109 for rearranging the quantized coefficients to form a one-dimensional series and dividing the transformed coefficients into two bands with a boundary defined therebetween along the positions of predetermined coefficients; variable-length encoders 105a and 105b for variable-length encoding the quantized coefficients of the individual bands separately according to a predetermined procedure and outputting the coefficients as encoded data of the individual bands; an encoding table 106 where variable-length codes to be used in the variable-length encoders 105a and 105b are registered; code buffers 107a and 107b where the encoded data of the individual bands are stored; and transferrers/memories 108a and 108b for transferring the encoded data in the code buffers or for storing such encoded data therein.

Figure 5:
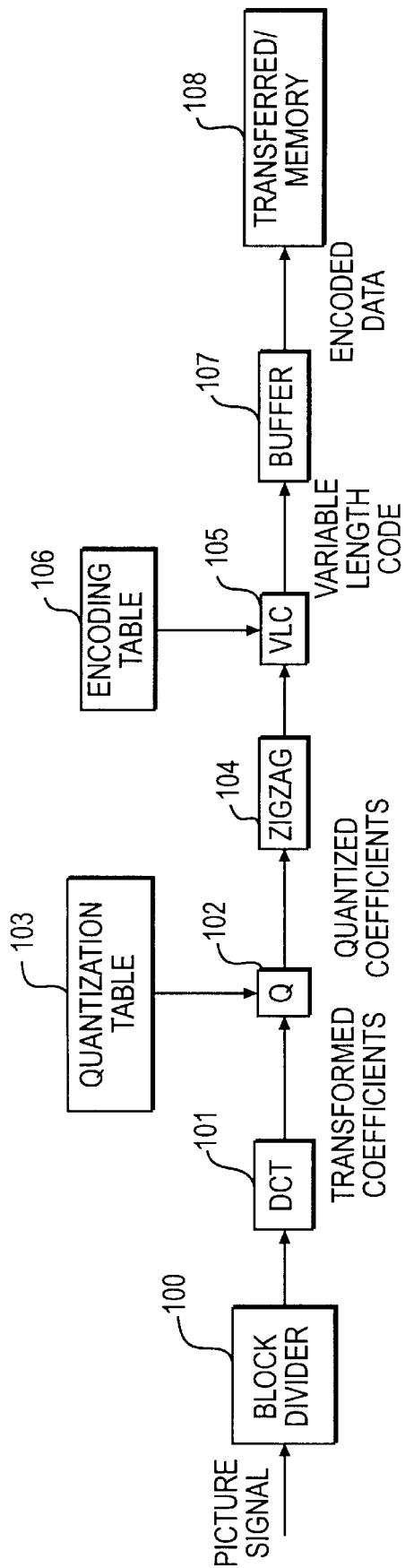
FIG. 5 is a block diagram of a conventional example according to the prior art.
Figures 7, 8:
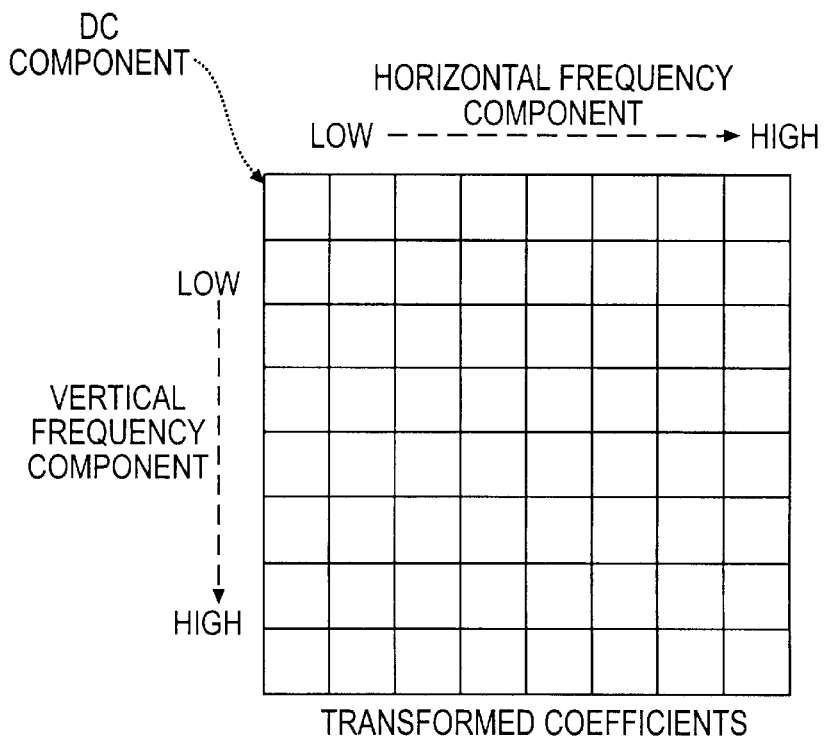
FIG. 7 shows transformed coefficients.
FIG. 8 is an explanatory diagram showing a one-dimensional arrangement of coefficients obtained by zigzag scanning.

In this diagram, any components corresponding to those in the constitution of FIG. 5 are denoted by like reference numerals.

Figure 4:
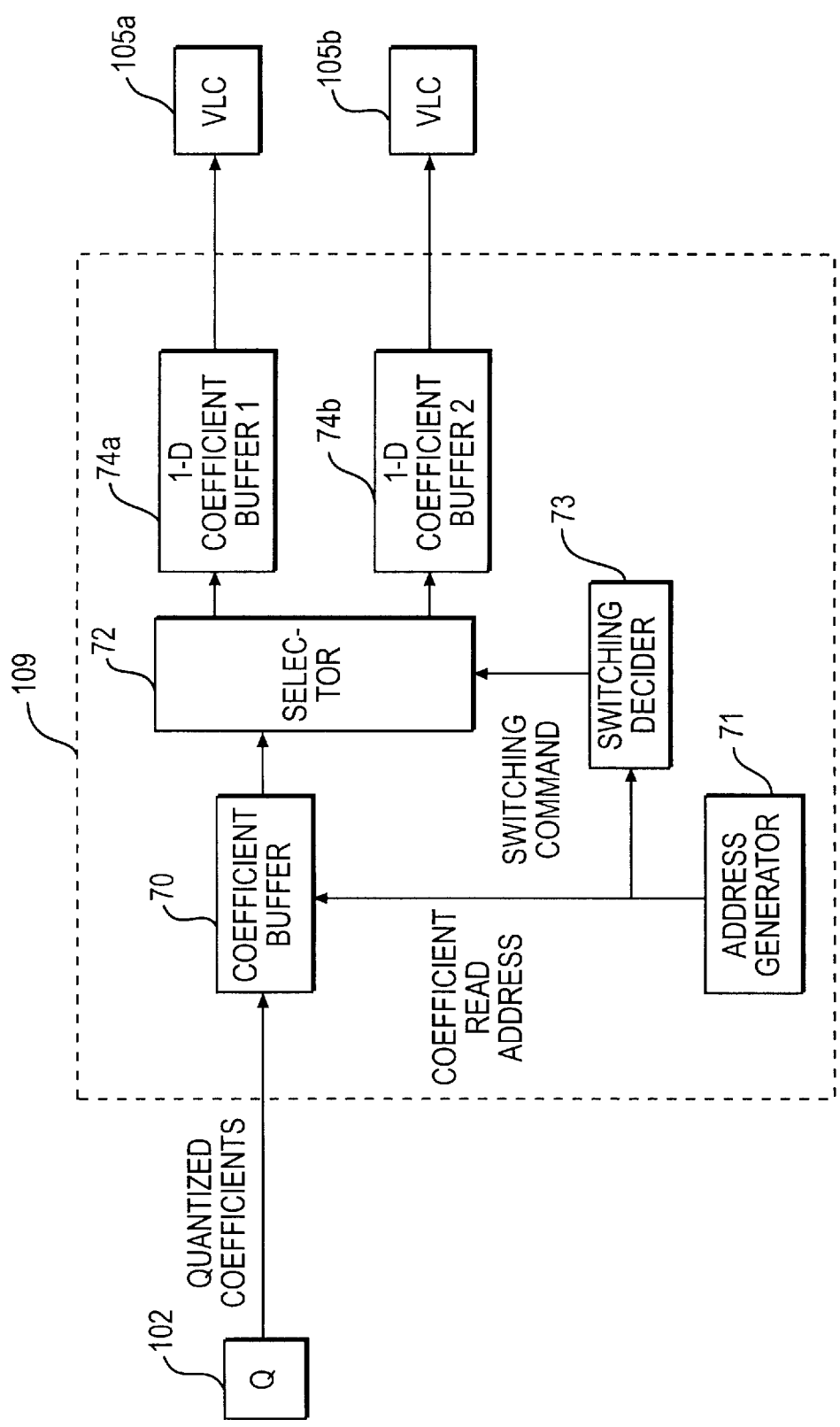
FIG. 4 is a block diagram of a scan divider.

FIG. 4 shows the configuration of the scan divider 109 included in FIG. 3(a). This configuration will be described below with reference to the diagram.

In FIG. 4, there are included a coefficient buffer 70 for storing the input quantized coefficients; an address generator 71 for generating addresses of the quantized coefficients read out from the coefficient buffer 70; a selector 72 for selectively switching the output destination of the quantized coefficients read out from the coefficient buffer 70; a switching decider 73 for outputting a switching command to the selector 72 on the basis of the address data obtained from the address generator 71; and one-dimensional coefficient buffers 74a and 74b for storing the quantized coefficients scanned to form a one-dimensional series.

Hereinafter the encoding operation will be described with reference to FIG. 3(a).

Since the operations of the block divider 100, the DCT processor 101 and the quantizer 102 have already been explained in connection with the conventional example of the related art, a repeated explanation thereof is omitted here.

Referring now to FIG. 4, a description will be given on the operation of the scan divider 109.

The quantized coefficients outputted from the quantizer 102 are first stored in the coefficient buffer 70, and then the quantized coefficients corresponding to the coefficient read addresses obtained from the address generator 71 are outputted to the selector 72. The coefficient read addresses obtained from the address generator 71 correspond to the zigzag scanning order in the transformed coefficient matrix, as shown in FIG. 2 for example. The coefficient read addresses are supplied also to the switching decider 73. Subsequently, the switching decider 73 makes a decision as to whether each of the input coefficient read addresses is anterior or posterior to the boundary position preset in conformity with the zigzag scanning order, and transmits a switching command to the selector 72. For example, when the 35th in the zigzag scanning order is preset as the boundary position in the quantized coefficient matrix of FIG. 2, the switching decider 73 makes a decision as to whether each quantized coefficient read out from the coefficient buffer 70 is within a range of 0 to 35 or within another range of 36 to 63 in the zigzag scanning order, and then a switching command indicative of either range is outputted from the switching decider 73.

In the selector 72, the quantized coefficients 0 to 35 read out from the coefficient buffer 70 in the zigzag scanning order are selectively outputted to the one-dimensional coefficient buffer 74a in response to the switching command transmitted from the switching decider 73, while the quantized coefficients 36 to 63 in the zigzag scanning order are selectively outputted to another one-dimensional coefficient buffer 74b in the same manner.

The quantized coefficients stored in the one-dimensional coefficient buffers 74a and 74b are encoded by the variable-length encoders 105a and 105b respectively. However, in the variable-length encoder 105a, DC encoding is applied to the quantized coefficient 0 in the zigzag scanning order. Since the variable-length encoding operation has already been described in connection with the conventional example of the related art and the principle of the present invention, a repeated explanation thereof is omitted here.

With regard to the code buffers 107a, 107b and the transferrers/memories 108a, 108b, a repeated explanation thereof is also omitted here for the same reason.

Thus, a picture signal can be encoded by the constitution and the operation mentioned above.

Figure 3B:
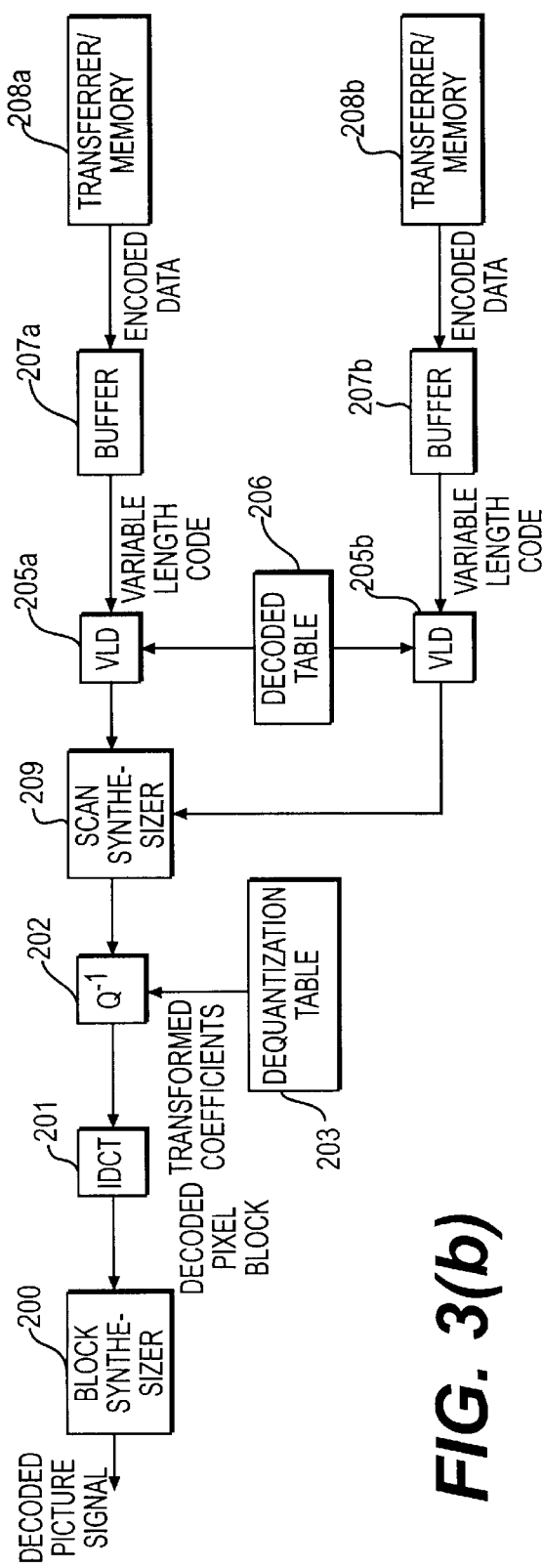

FIG. 3(b) is a block diagram of the embodiment representing the decoding system of the present invention. In this diagram, there are included transferrers/memories 208a and 208b; code buffers 207a and 207b for storing the encoded data of individual bands; variable-length decoders 105a and 105b for decoding the encoded data of the individual bands; an encoding table 106 where a code list to be used for variable-length decoding is preset; a scan synthesizer 209 for scanning the one-dimensional quantized coefficients decoded per band and synthesizing such coefficients to thereby produce quantized coefficients of one block; a dequantizer 202 for dequantizing the quantized coefficients to reproduce transformed coefficients; a dequantization table 103 where dequantization characteristic is preset; an IDCT (inverse discrete cosine transform) processor 201 for executing an IDCT process of the transformed coefficients and outputting a decoded pixel block; and a block synthesizer 200 for synthesizing the decoded pixel blocks to thereby form a decoded picture signal.

Hereinafter the operation will be described with reference to FIG. 3(b).

The encoded data of the individual bands generated by the embodiment of the encoding system according to the present invention are read out from the transferrers/memories 108a and 108b respectively and then are stored in the code buffers 107a and 107b. Thereafter the data are decoded by the variable-length decoders 105a and 105b, so that quantized coefficients of the individual bands are reproduced. In the decoding table 206 is set a code list which corresponds to the codes set previously in the encoding table 106.

The quantized coefficients of the individual bands are synthesized again by the scan synthesizer 209 and are further scanned to be transformed from the one-dimensional data series to a quantized coefficient matrix of one block.

The quantized coefficients are dequantized in the dequantizer 202 with the characteristic corresponding to the quantization characteristic set previously in the encoding quantization table 103, whereby transformed coefficients are produced.

The transformed coefficients thus obtained are then supplied to the IDCT processor 201, where an inverse DCT process is executed to reproduce a decoded pixel block. The decoded pixel blocks are synthesized in the block synthesizer 200, so that a decoded picture signal is reproduced.

Thus, the encoded data generated by the encoding system of the present invention can be decoded to reproduce a picture signal by the constitution and the operation mentioned above.

Although DCT has been taken as an example of orthogonal transformation for explaining the embodiment, it is to be understood that the present invention is not limited thereto alone, and any other orthogonal transformation such as Adamarl transformation or slant transformation may be adopted as well.

In the scan divider 109, zigzag scanning is employed for arranging the transformed coefficients in one-dimensional series. However, any other scanning order may also be employed. And the division of coefficients is not limited to two groups alone.

Further in the embodiment of FIG. 3(a) representing the encoding system of the present invention, the quantized coefficients obtained from the quantizer 102 are divided into bands by the scan divider 109, but it is possible to replace the quantizer 102 and the scan divider 109 with each other. More specifically, the effect of the present invention is achievable even in a modification where the transformed coefficients outputted from the DCT processor 101 are divided into bands and then the transformed coefficients of the individual bands are quantized separately.

As described hereinabove, the encoded data input/output speed can be reduced in the present invention due to the improved constitution where the variable-length encoder and the variable-length decoder that cause speed variations in the encoding system based on orthogonal transformation are disposed in parallel with each other to disperse the input and output of the encoded data.

Consequently, it becomes possible to realize stable input and output of the encoded data even by the use of low rate transfer paths or low input/output speed memory devices, so that proper encoding and decoding operations can be performed without the necessity of halting the input or output of a picture signal or decelerating the input/output speed despite succession of such pixel blocks where multiple higher-frequency coefficients are generated.

In addition, changing the number of parallel connections enables adequate correspondence to a variety of transfer paths or memory devices to eventually enhance the flexibility of the system constitution.

What is claimed is:

1. A picture signal encoding apparatus comprising:
   block divider means for dividing a picture signal into pixel blocks each having a rectangular region of M×N picture elements (where M and N are positive integers);
   orthogonal transformer means for executing orthogonal transformation of the pixel blocks to thereby obtain transformed coefficients;
   quantizer means for quantizing the transformed coefficients with a predetermined quantization characteristic to thereby obtain quantized coefficients;
   band divider means for dividing the quantized coefficients into a plurality of mutually prime subsets;
   a plurality of variable-length encoder means for variable-length encoding each of the subsets of the quantized coefficients to obtain encoded data of each subset, wherein said plurality of variable length encoder means have a common encoding table; and
   a plurality of memory or transfer means for storing or transferring the encoded data of each subset individually.

2. A picture signal encoding apparatus comprising:
   block divider means for dividing a picture signal into pixel blocks each having a rectangular region of M×N picture elements (where M and N are positive integers);
   orthogonal transformer means for executing orthogonal transformation of the pixel blocks to thereby obtain transformed coefficients;
   a plurality of band divider means for dividing the transformed coefficients into a plurality of mutually prime subsets;
   a plurality of quantizer means for quantizing the transformed coefficients for each of said subsets to obtain quantized coefficients for each subset;
   a plurality of variable-length encoder means for variable-length encoding the quantized coefficients of each of said subsets to obtain encoded data of each subset, wherein said plurality of variable length encoder means have a common encoding table; and
   a plurality of memory or transfer means for storing or transferring the encoded data of each subset individually.

3. A picture signal encoding apparatus comprising:
   block divider means for dividing a picture signal into pixel blocks each having a rectangular region of M×N picture elements (where M and N are positive integers);
   orthogonal transformer means for executing orthogonal transformation of the pixel blocks to thereby obtain transformed coefficients;
   quantizer means for quantizing the transformed coefficients with predetermined quantization characteristic to thereby obtain quantized coefficients;
   band divider means for dividing the quantized coefficients into a plurality of mutually prime subsets, wherein, when the quantized coefficients are divided into a plurality of mutually prime subsets, boundaries of such division are determined by the positions of one-dimensional series obtained by zigzag-scanning a matrix of the transformed coefficients or the quantized coefficients from a lower-frequency region to a higher-frequency region;
   a plurality of variable-length encoder means for variable-length encoding each of the subsets of the quantized coefficients to obtain encoded data of each subset; and
   a plurality of memory or transfer means for storing or transferring the encoded data of each subset individually.

4. A picture signal decoding apparatus for decoding picture signals encoded in pixel blocks divided into a plurality of subsets, the apparatus comprising:
   memory or transfer means for storing or transferring the encoded data of each subset individually;
   a plurality of variable length decoder means for variable-length decoding the encoded data of each subset individually to thereby obtain quantized coefficients of each subset; and
   band synthesizer means for synthesizing the quantized coefficients of each subset to thereby obtain quantized coefficients of one pixel block.

5. A picture signal decoding apparatus for decoding picture signals encoded in pixel blocks divided into a plurality of subsets, the apparatus comprising:
   memory or transfer means for storing or transferring the encoded data of each subset individually;
   a plurality of variable length decoder means for variable-length decoding the encoded data of each subset individually to thereby obtain quantized coefficients of each subset;
   band synthesizer means for synthesizing the quantized coefficients of each subset to thereby obtain quantized coefficients of one pixel block;
   a plurality of dequantizer means for dequantizing the quantized coefficients of each subset to obtain transformed coefficients of each subset;
   inverse orthogonal transformation means for executing inverse orthogonal transformation on the transformed coefficients producing a decoded pixel block; and
   block synthesizer means for synthesizing decoded pixel blocks to reconstruct a picture signal.

6. A picture signal encoding apparatus comprising:
   block divider means for dividing a picture signal into pixel blocks each having a rectangular region of M×N picture elements (where M and N are positive integers);
   orthogonal transformer means for executing orthogonal transformation of the pixel blocks to thereby obtain transformed coefficients;
   a plurality of band divider means for dividing the transformed coefficients into a plurality of mutually prime subsets, wherein, when the transformed coefficients are divided into a plurality of mutually prime subsets, boundaries of such division are determined by the positions of one-dimensional series obtained by zigzag-scanning a matrix of the transformed coefficients from a lower-frequency region to a higher-frequency region;

a plurality of quantizer means for quantizing the transformed coefficients for each of said subsets to obtain quantized coefficients for each subset;

a plurality of variable-length encoder means for variable-length encoding the quantized coefficients of each of said subsets to obtain encoded data of each subset; and a plurality of memory or transfer means for storing or transferring the encoded data of each subset individually.

7. A picture signal encoding apparatus comprising:

block divider means for dividing a picture signal into pixel blocks, each having a rectangular region of M×N picture elements (where M and N are positive integers);

orthogonal transformer means for executing orthogonal transformation of the pixel blocks to thereby obtain transformed coefficients;

quantizer means for quantizing the transformed coefficients with a predetermined quantization characteristic to thereby obtain quantized coefficients;

means for arranging the quantized coefficients into a predetermined order;

band divider means for dividing the quantized coefficients into a plurality of mutually prime subsets of frequency bands according to the quantized coefficients positions in the predetermined order;

a plurality of variable-length encoder means for variable-length encoding each of the subsets of the quantized coefficients to obtain encoded data of each subset, wherein said plurality of variable length encoder means have a common encoding table;

a plurality of memory and transfer means for storing and transferring the encoded data of each subset individually; and means for decoding transferred subsets to obtain each quantized coefficient within a subset.

8. A picture signal encoding apparatus comprising:

block divider means for dividing a picture signal into pixel blocks each having a rectangular region of M×N picture elements (where M and N are positive integers);

orthogonal transformer means for executing orthogonal transformation of the pixel blocks to thereby obtain transformed coefficients;

quantizer for quantizing the transformed coefficients and outputting the quantized coefficients by referring to a quantization table;

a scan divider for arranging the quantized coefficients to form a one-dimensional series and dividing the transformed coefficients into two bands;

variable-length encoders for separately variable-length encoding the quantized coefficients for the two bands using an encoding table;

first and second buffers for respectively storing the encoded coefficients for each of the two bands; and means for transferring the encoded coefficients from the buffers.

* * * * *